US005794212A

United States Patent [19]

Mistr, Jr.

[11] Patent Number: 5,794,212

[45] Date of Patent: Aug. 11, 1998

[54] SYSTEM AND METHOD FOR PROVIDING MORE EFFICIENT COMMUNICATIONS BETWEEN ENERGY SUPPLIERS, ENERGY PURCHASERS AND TRANSPORTATION PROVIDERS AS NECESSARY FOR AN EFFICIENT AND NON-DISCRIMINATORY ENERGY MARKET

[75] Inventor: Alfred F. Mistr, Jr., Chesterfield County, Va.

[73] Assignee: Dominion Resources, Inc., Richmond, Va.

[21] Appl. No.: 630,783

[22] Filed: Apr. 10, 1996

[51] Int. Cl.$^6$ .............................. G06F 15/20; G06F 15/22
[52] U.S. Cl. .............................. 705/26; 705/37; 705/412; 364/401; 364/403; 364/408
[58] Field of Search ................................... 705/5, 412, 1, 705/37, 26

[56] References Cited

U.S. PATENT DOCUMENTS

| | | | |
|---|---|---|---|
| 3,465,164 | 9/1969 | Couvreur | 307/57 |
| 3,849,637 | 11/1974 | Caruso et al. | 364/492 |
| 4,677,552 | 6/1987 | Sibley, Jr. | 705/37 |
| 4,689,752 | 8/1987 | Fernandes et al. | 364/492 |
| 5,038,284 | 8/1991 | Kramer | 705/37 |
| 5,136,501 | 8/1992 | Silverman et al. | 705/37 |
| 5,216,623 | 6/1993 | Barrett et al. | 364/553 |
| 5,237,507 | 8/1993 | Chasek et al. | 705/412 |
| 5,243,515 | 9/1993 | Lee | 705/37 |
| 5,253,165 | 10/1993 | Leiseca et al. | 705/5 |
| 5,278,772 | 1/1994 | Knupp | 364/492 |
| 5,329,464 | 7/1994 | Sumic et al. | 364/512 |
| 5,347,466 | 9/1994 | Nichols et al. | 364/492 |
| 5,375,055 | 12/1994 | Togher et al. | 705/37 |
| 5,495,412 | 2/1996 | Thiessen | 705/1 |
| 5,664,115 | 9/1997 | Fraser | 705/37 |

OTHER PUBLICATIONS

Real-Time Information Networks, Comments of Dominion Resources, Inc. and Power Technologies, Inc. at the Federal Energy Regulatory Commission Technical Conference, Jul. 28, 1995.

Remarks by Alfred F. Mistr, Jr. on the Impacted MW-Mile Scenario, Feb. 14, 1995.

A Proposal for Fundamental Reform of Transmission Pricing, by Alfred F. Mistr, Jr., May 5, 1992.

Impacted MW-Mile: A New Approach to Transmission Pricing, by Alfred F. Mistr, Jr., Dec. 2, 1993.

Transmission Pricing Workshop Presentation by Alfred F. Mistr, Jr. on Jun. 19, 1995.

Dominion Resources, Inc. Reply to Federal Energy Regulatory Commission in Docket No. RM95-9-000 on Jul. 28, 1995.

Dominion Resources, Inc. Initial Comments to Federal Energy Regulatory Commission in Docket Nos. RM95-8-000 and RM94-7-001 on Jul. 28, 1995.

Dominion Resources, Inc. Impacted Megawatt-Mile Transmission Tariff Proposal, Mar. 13, 1996.

*Primary Examiner*—Allen R. MacDonald
*Assistant Examiner*—Jagdish Patel
*Attorney, Agent, or Firm*—J. Michael Martinez de Andino; McGuire, Woods, Battle & Boothe LLP

[57] ABSTRACT

A method for providing more efficient communication between energy suppliers, energy purchasers, and transportation providers and having an administrator to assist in the transmission of energy as necessary for providing timely movement of energy. The method includes the steps of connecting an energy supplier, a buyer, a transmission supplier and the administrator through a network, and providing a program-controlled processor for receiving energy information from the buyer, the energy supplier and the transmission supplier. The processor is adapted to process and store the energy information, and communicate the energy information via the network to all the parties. The method includes the steps of verifying the reliability of the transportation of energy, providing access to the buyer to the energy information stored in a data base connected to the processor to assist the buyer in negotiating for the transportation of energy, and communicating the acceptance by the buyer to the energy supplier and to the transmission supplier. The method can further include the steps of sending invoices for the transmission of energy and paying the energy supplier and the transmission supplier for the transmission.

19 Claims, 5 Drawing Sheets

SYSTEM AND METHOD FOR PROVIDING MORE EFFICIENT COMMUNICATIONS BETWEEN ENERGY SUPPLIERS, ENERGY PURCHASERS AND TRANSPORTATION PROVIDERS AS NECESSARY FOR AN EFFICIENT AND NON-DISCRIMINATORY ENERGY MARKET

I. TECHNICAL FIELD

The present invention relates to a system that provides the means necessary for the more economically efficient movement of energy from a potential seller to a potential buyer utilizing an open access transportation system. More particularly, the present invention relates to such a system and method that provides for non-discriminatory network communication between owners and users of transportation facilities, accumulates data in real time from diverse sources and allows for a true market based assessment of available energy supply, identifies available transmission routes and provides for the timely movement of energy.

II. BACKGROUND OF THE INVENTION

The electrical power transmission network in the United States consists of some 150,000 miles of high voltage—230,000 volts and above—transmission lines. There are another 40,000 miles of transmission lines in Canada. Power flows mainly within three interconnections or grids. The Eastern grid covers states east of the Rocky Mountains except for Texas. The Western grid covers the Rocky Mountains states and the west coast. The Texas grid covers most of Texas. Only modest amounts of power can be transferred between the grids.

Within the grids there are some 145 "control areas" consisting of systems of transmission lines that are connected to generating units and to electrical loads. Each control area, which can be a single utility or a group of utilities, controls the electrical generation to match the area generation with the area load. The match of generation and load is essential to maintain electricity within North America's designated frequency band width near 60 hertz.

Power is transmitted to another control area when the supplying control area raises its area generation above its area load and the importing area reduces its area generation below its area load by about the same amount. The generation in the exporting area may be slightly higher than the amount of power imported to offset the line losses in transmission. The electrical power will flow between the areas, but not over any single direct path. The flow will distribute itself over multiple paths in the interconnected network.

For example, a power transfer from Indiana to New Jersey would produce actual power flows over the lines of more than 20 different utilities and power pools. Less than half of the transferred power would flow over what would appear to be a relatively direct route. Some of the transferred power would flow north through Michigan and Ontario and reach its destination through New York. Another portion would go south through Kentucky, Tennessee, North Carolina and Virginia.

Under the current approach for pricing the transfer of electrical power, hereinafter referred to as the "Contract Path Approach," an energy provider and a prospective energy buyer need to negotiate with many separate transmission owners to arrange the transmission of the energy from the provider to the buyer. The provider and buyer would first contact the transmission owner located closest to the provider. Ideally, after negotiating a contract with this first transmission owner, the provider and buyer would enter into separate contracts with adjacent transmission owners that would provide for a transmission path for the transportation of energy from the provider to the buyer. Unfortunately, sometimes the purchaser and the buyer find that a transmission owner is unable or unwilling to enter into such a negotiated contract. Therefore, the purchaser and buyer may need to renegotiate a contract with an alternate transmission owner in order to locate a second transmission owner who in an acceptable location would be willing to enter into a transmission of energy contract.

These negotiated contract paths, unfortunately, may not actually be the transmission lines that are actually used when the energy is transported from the purchaser to the buyer. This is further complicated because the provider and the buyer will tend to enter into negotiated contracts with transmission owners who state that they can provide the transmission at the least costly transmission price. This is why the negotiated path is sometimes referred to as the Contract Path. The Contract Path, however, has little or no actual relationship to the actual energy flow path, because the transported energy will follow the laws of physics and be transported along the electrical path according to the laws of physics. This means that some transmission owners may have their transmission lines used during the transportation of energy and not be compensated or involved in the negotiated contracts.

The above-described Contract Path Approach is very time consuming and inefficient because it requires the purchaser and the buyer to spend time and money in negotiating separate contracts for the transportation of energy. The Contract Path Approach also fails to provide for payment to the transmission owners that may actually provide the service, and may also present inaccurate and misleading price signals. The result is that the transmission prices may be virtually unrelated to the actual costs of providing electrical transmission service for a specific transaction. This phenomena works against the establishment of efficient additions to the energy transportation network because the transmission owners who are not assured compensation for the use of their transmission lines, may be unwilling to construct or acquire efficient new transmission lines.

For example, the Contract Path Approach fails to provide users and owners with the most efficient and timely use of the energy transportation network. The Contract Path Approach also fails to provide incentives for power plant developers to choose the location that would result in the lowest combined costs of power generation and transmission, and fails to encourage the efficient use of existing transmission capacity. It sends distorted and misleading signals to potential users.

In order to overcome the above-mentioned defects in the Contract Path Approach and to overcome the inefficiencies in the present energy transportation network, there is a need for an improved system and method for energy trading that provides for (i) proper allocation and payment for facilities actually used; (ii) speed of communication between the energy provider, the energy purchaser and the transmission owners and of timely commitment between the same; (iii) continuous evaluation of reliability of the delivery of energy; (iv) availability of information to the provider, the buyer and the transmission owners simultaneously and without discrimination; (v) uniform posting of offers to sell and offers to buy energy; and (vi) uniform terms and conditions between all buyers, providers and transmission owners. The system and method of the present invention provides these requirements as described in the following summary.

III. SUMMARY OF THE INVENTION

In accordance with the present invention, the disadvantages of the prior Contract Path Approach in determining power availability and the rates to be charged, allocating the costs and providing for the movement of the energy have been overcome. The system of the present invention accumulates data in real time from the control areas by having the different transmission owners, energy providers and energy buyers within the electrical interconnections be connected via a computer network. The transmission owners are connected through the network to a data review board that ensures that any information about the transmission owner's facilities is accurate and uniform. The information that is sent to the data base by the transmission owners includes energy transportation network data, such as the physical and electrical characteristics of the transmission owner's facilities including, but not limited to, the voltage, rating, impedance and length of each and every segment of the transmission lines. Upon the review by the data review board, the information from the transmission owners is combined and sent to a processor for storage in a data base. The transmission owners, energy providers and energy buyers (collectively hereinafter referred to as "energy system users") are connected to the processor through the computer network for accessing the information stored in the data base. The energy system users each have a computer terminal that is also connected via the computer network to an Administrator, who acts as an agent for the energy system users.

The energy system users through the use of their computer terminals can simultaneously review the stored data and make informed decisions about the availability and cost for the use of the energy transportation network. The Administrator has a computer terminal to maintain a current storing and recording of the incremental data in the data base, as well as for communicating with the energy system users through the computer network.

The system of the present invention thus provides the energy system users with the ability to use the computer network to negotiate on a timely basis for the efficient and reliable movement of energy between the parties, which is hereinafter referred to as the "incremental market." The transmission owners, providers and buyers can each be or become a user of energy or of the energy transportation network. Upon the completion of a negotiation for the movement of energy, the respective user sends a confirmation of the negotiated movement of energy to the Administrator via the network. The Administrator upon receipt of such confirmation, updates the data base with the proposed transaction, thereby ensuring that the data base maintains an accurate representation of the energy transportation system. Simultaneously, the Administrator sends the information about the proposed transaction to a temporary memory connected to the processor for future billings and payments for the movement of energy. The temporary memory accumulates the transactions that occur over a period of time and allows the Administrator to send composite invoices for the total costs of energy transactions which occurred during such period of time.

The Administrator would provide software to the energy system users that would be necessary to process the data base maintained by the processor to determine the availability and allocation of transportation needed for the movement of energy (referred to as "system allocation"). By identifying the facilities actually used, the transmission owners could be compensated for—and users can be charged for—only the facilities that are actually used to move the energy.

The data gathering operation of the present invention is carried out by a processor. The processor has a temporary memory, which provides the processor with the means of storing real time facility on-site data and energy requests and transmitting this information to the data base for purposes of updating the data base.

In accordance with the present invention, an energy system user analyses on its terminal a desired transaction for the movement of energy, such as the transmission of a requested amount of electrical power. If the required facilities are available and the price is acceptable to the user he notifies the Administrator. The user's request is received by the processor. The processor temporarily stores the proposed transaction in the temporary memory and prompts the user to send any additional information concerning its use of the energy transportation network to the Administrator, if not already stored in the temporary memory. The processor upon receipt of the prompted information processes the information and identifies the user, the user's respective facilities and the available transportation means for the transfer of energy. The user's information and the processed data is transmitted to the data base for updating the data base. The Administrator can then communicate with the user using the stored data that can be displayed on the Administrator's computer terminal.

If there is no capacity available for a desired transaction the potential user may request bids from those able to free up the needed capacity. The Administrator may assist in this task by supplying to the potential user a list of transactions that may satisfy the requested requirement. The potential user could seek bids via the computer network from other users who may be able to free up capacity on the constrained energy transportation network. The supplying user could then charge the potential user with the opportunity cost for having to give up or forego a current use or a previous commitment to use the energy system. The opportunity cost, if accepted, would be in addition to the transportation cost.

Accordingly, it is the primary object of the present invention to provide an improved system and method that provides for the timely and more efficient communications between energy suppliers, buyers and transmission owners as necessary for an efficient and non-discriminatory energy market that accumulates data in real time from diverse sources and allows for a true market based assessment of available energy supply, identifies available transportation, and provides for the timely movement of available energy.

It is a further object of this invention to provide such an improved system and method that includes a processor having a temporary memory, which accumulates data in real time from diverse sources via a computer network and allows for a market based assessment of available energy supply, identifies available transportation, transmits the accumulated data for analysis, and provides for cost-efficient movement of energy, which may include the opportunity costs incurred to mitigate a transportation constraint. Other objects and advantages of this invention will become apparent from the following description taken in connection with the accompanying drawings wherein are set forth, by way of illustration and example, certain embodiments of this invention.

IV. BRIEF DESCRIPTION OF THE DRAWINGS

V. DETAILED DESCRIPTION OF THE INVENTION

Before the present system and method for analyzing energy supply and providing for the timely movement of energy is described, it is to be understood that this invention is not limited to a particular energy or to a specific method or system, as such may, of course, vary. It is also to be understood that the terminology used herein is for the purpose of describing particular embodiments only, and is not intended to be limiting as the scope of the present invention will be limited only by the appended claims. Further, unless defined otherwise, all terms used herein have the same meaning as commonly understood by one of ordinary skill in the art to which this invention belongs.

1. The System

Figure 1:
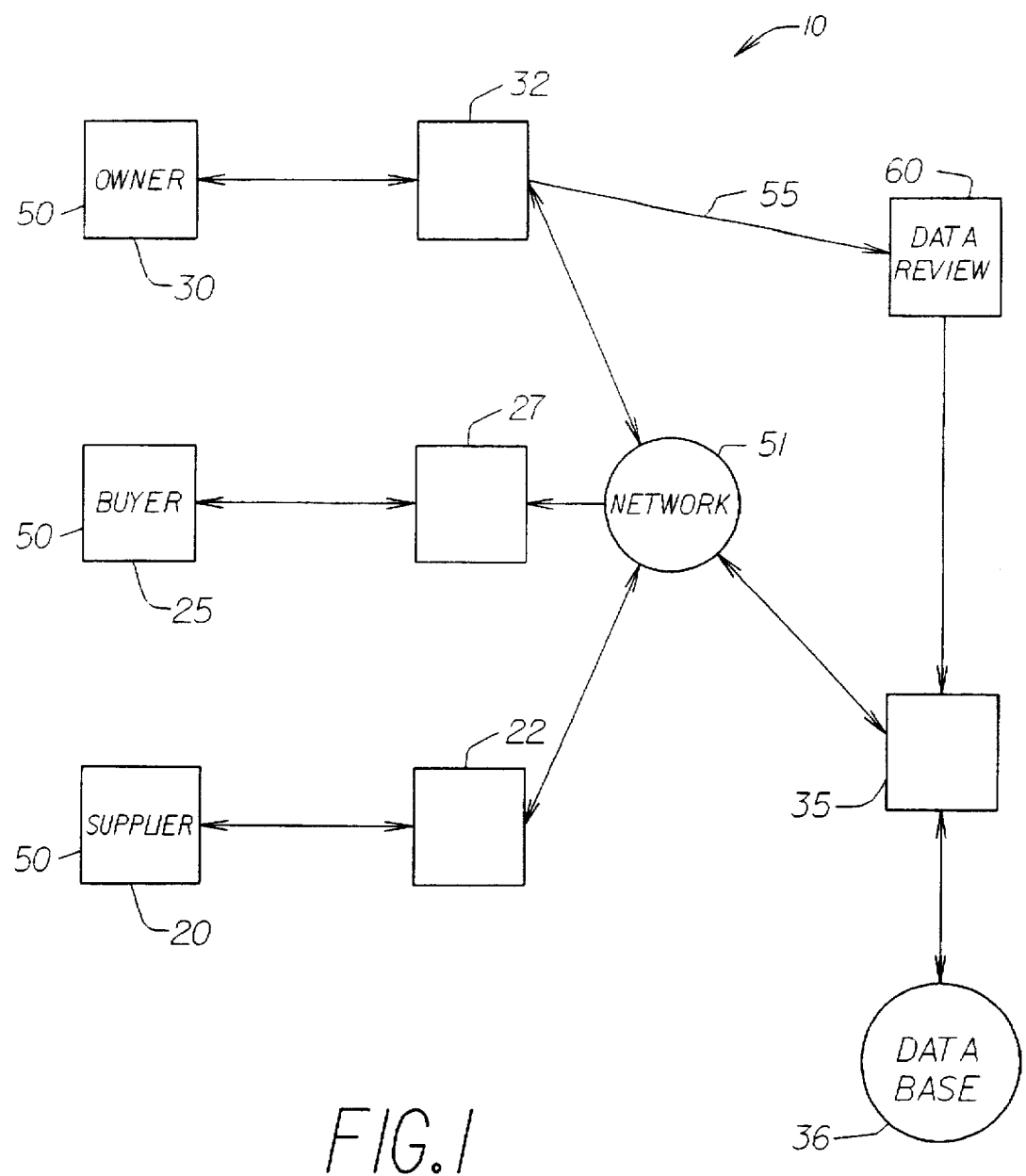
FIG. 1 is a block diagram illustrating the basic structure of the invention.

With reference now to FIG. 1 of the drawings, there is illustrated an exemplary system in which the invention may be advantageously practiced. Shown is an energy information and transportation allocation system 10 that provides for a communication link to an energy provider 20, a buyer of energy 25 and a transmission line owner 30 (each also being referred to as an "energy system user 50"). The system 10 allows for energy transportation allocation based on peak conditions for an energy transportation network. The system 10 includes a processor 35 that communicates with PC computers 22, 27 and 32 through a network 51. The PC computers 22, 27 and 32 communicate with their respective energy system user 50 for receiving and transmitting data and information to the processor 35 for storing the data and information in a data base 36, which is connected to the processor 35. The data and information sent to the processor 35 includes the electrical and physical characteristics of the energy transportation network and the physical line data 55 from the transmission line owner 30. The amount of available electrical power, as well as any requests for purchasing power is also sent to the processor 35 via the network 51.

The transmission line owner 30 sends the physical line data 55 to the processor 35 via the PC computer 32 to a data review board 60 and ultimately to the processor 35. The third party review by the data review board 60 ensures that reliable and accurate transportation information 55 is being sent to the processor 35 for storage in the data base 36. The data base 36 accumulates the information received in order to provide the energy system users 50 with accurate and complete information about the energy transportation network.

The energy system users 50 can simultaneously through the network 51 communicate with each other and have access to the information stored in the data base 36 for review thereof. Additionally the energy system users 50 can use this accessed information for making informed decisions about the use of the energy transportation network during peak conditions. The peak conditions describe the use of the energy transportation network during conditions of maximum loading or transmission of energy.

Figure 2:
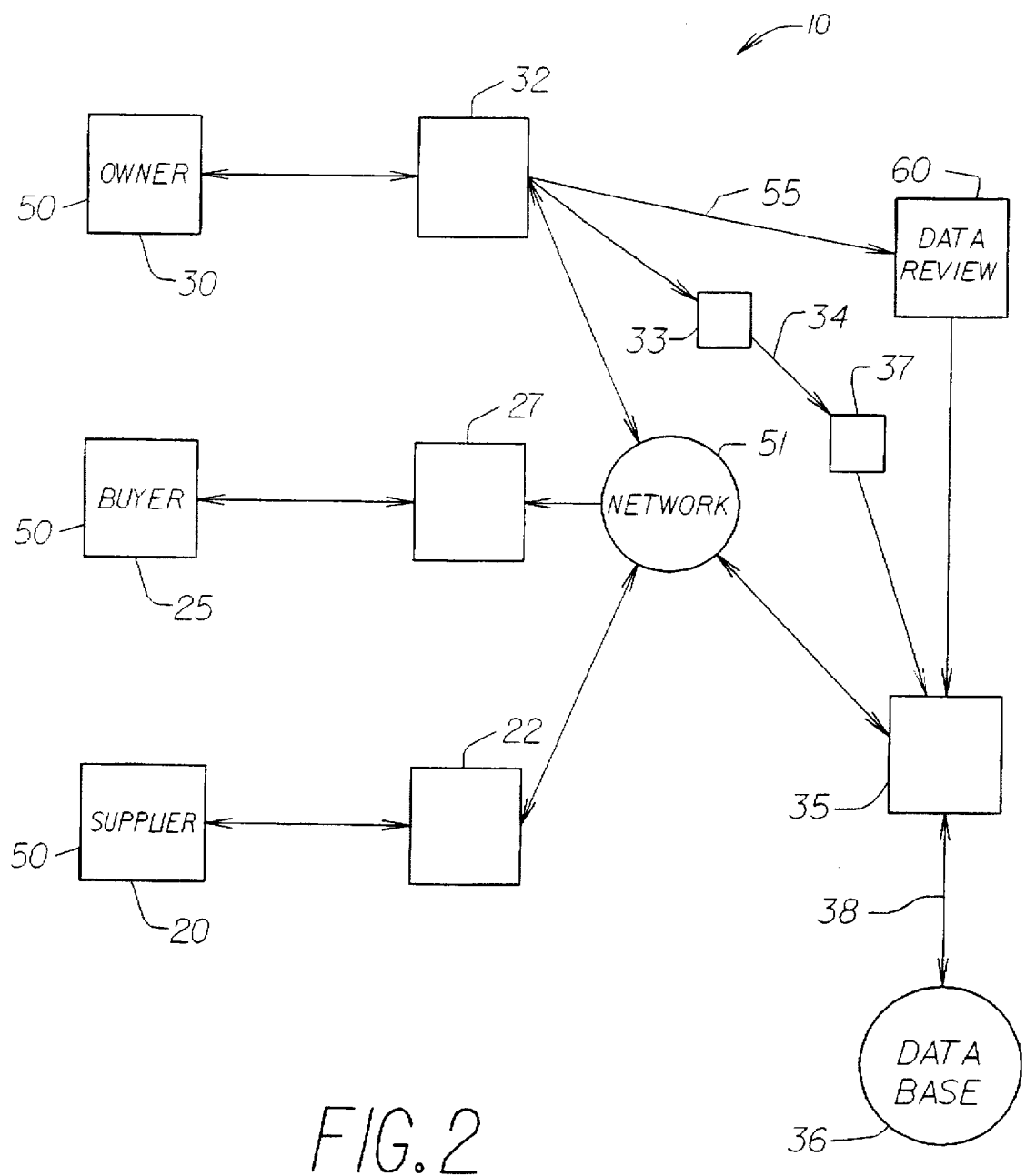
FIG. 2 is a block diagram illustrating the basic structure of the invention with a temporary memory and a real time data link connected to the processor.

Referring now to FIG. 2, the system 10 is shown with the addition of a real time data link 33. The transmission line owners 30 through its PC computer 32 can transmit real time transportation information and information concerning the current loading of its facilities (referred to as the "real time information 34") through the real time data link 33 to a temporary memory 37. The real time information 34 is combined in the processor 35 with the transportation information 55, which includes information during peak conditions, for storing such combined information 38 in the data base 36. The combined information 38 can provide the energy system users 50 with the ability to make short term informed decisions about the use of the energy transportation network.

Figure 3:
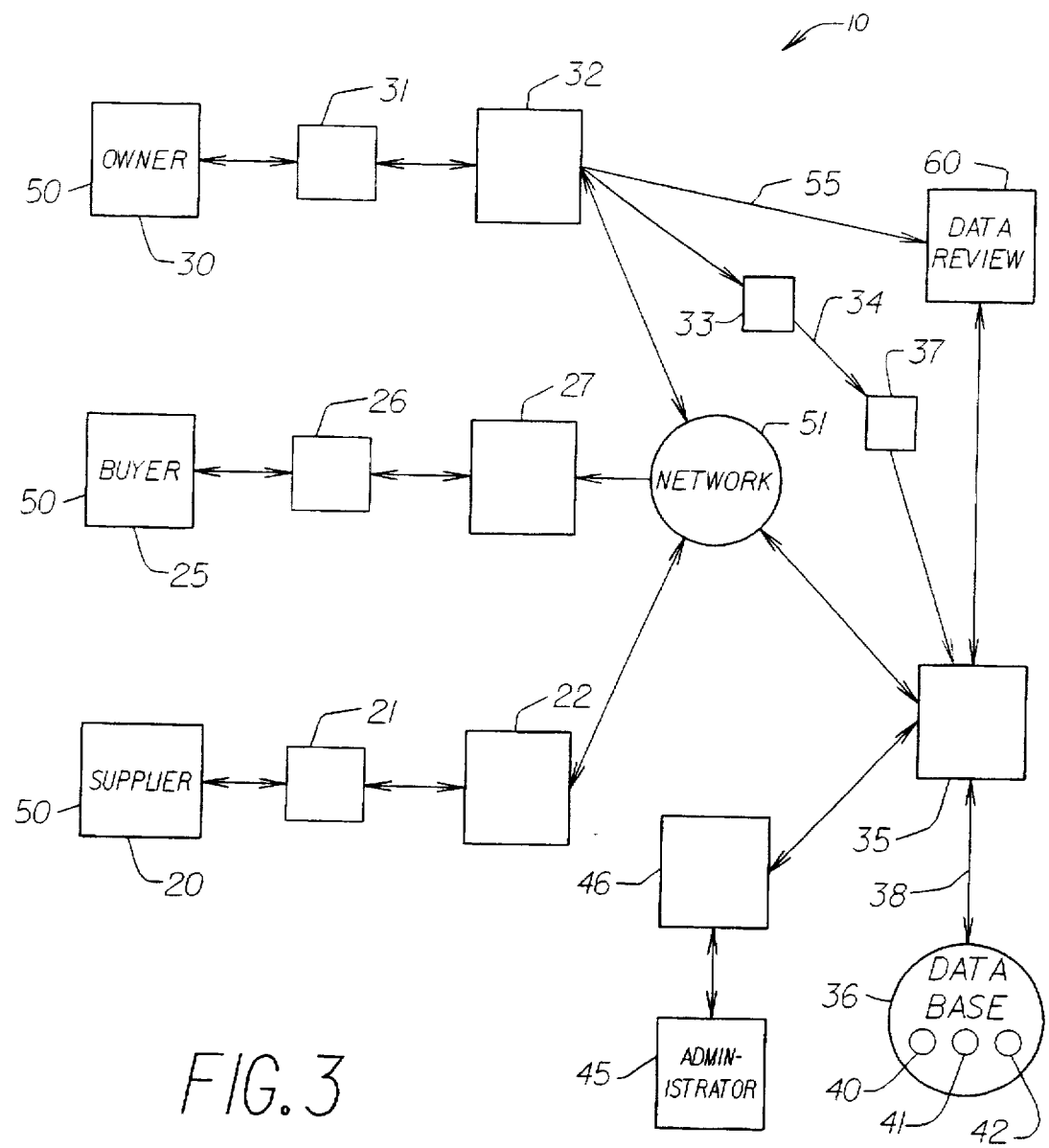
FIG. 3 is a more detailed block diagram illustrating the structure of the invention with an Administrator function which further increases the efficiency of the system.

Referring now to FIG. 3, the system 10 is shown with the data base 36 having at least three data files 40, 41 and 42. Further, an Administrator 45, which acts as an agent for the energy system users 50 is connected to the processor 35 through a terminal 46. The Administrator 45 is able to access any information stored in the data base 36 by communicating with the processor 35 through the use of the terminal 46. The Administrator 45 can also communicate with the energy system users 50 through the network 51 through processor 35.

The energy system users 50 can also view any information stored in the data base 36 through their respective terminals 21, 26 and 31 that are connected to the PC computers 22, 27 and 32, respectively. As shown in FIGS. 1–3, the Energy Information sent by the energy system users 50 would be received by the processor 35. The processor 35 is adapted for receiving and transmitting the data and the information through the network 51. The processor 35 can be of the type which may be installed or integrated within a host computer (not shown), such that the computer can operate and perform the functions of the processor 35. With the processor 35 being adapted to communicate with the Administrator 45, it should, therefore, be understood that the system 10 provides for more efficient communication means between the energy system users 50. The Administrator 45 acting as an agent for the energy system users 50, serves as the clearinghouse for electrical transmission transactions and helps to coordinate the use of the system 10.

As shown in FIG. 3, the processor 35 through the use of the temporary memory 37 is adapted to temporarily store information and communication from the energy system users 50. One example of such communications from the energy system users 50 is when the buyer 25, the provider 20 and the transmission line owner 30 agree on an amount of available electrical power, a purchase and a transportation cost, and on the use of the available transportation facilities. This agreement between the parties is then sent to the processor 35 for incorporation in the appropriate data file 40, 41 or 42 depending on the terms of the agreement between the parties.

The data file 40 stores information concerning guaranteed or firm transmissions between the respective parties. The data base 41 stores information concerning standard non-guaranteed or non-firm transmissions that are subject to the guaranteed or firm transmission commitments stored in data file 40. Therefore, if the buyer 25, the provider 20 and the transmission line owner 30 agree on a transmission of energy that is guaranteed to occur, such transmission of energy would normally be priced at a predetermined or calculated price and would have priority over all non-guaranteed or non-firm proposed transmissions. However, if the parties agree on a transmission of energy that is to occur but will be subject to load conditions, then such transmission of energy would normally be priced at a floating price or at a price that will fluctuate depending on the loading of the energy transportation network. This transmission, being called a standard non-firm transmission, would be subject to energy transportation network availability after all guaranteed or firm transmission commitments have been loaded or scheduled.

The data file 42 stores information concerning a priority non-firm transmission of energy that is subject to the guaranteed transmission and the load conditions at the time of use. These priority non-firm transmissions have priority over the standard non-firm transmissions and can force the transmission line owner 30 to curtail the standard non-firm transmission use if the load conditions require such curtailment to occur. Therefore, if an agreement for a transmission of energy is reached between the energy system users 50, information is stored about the proposed transmission is stored in the appropriate data file in the data base 36 depending on the terms of the agreement.

The energy system users 50 can communicate with the Administrator 45 through the use of the terminals 21, 26 and 31, respectively, that are connected to the PC computers 22, 27 and 32, respectively. The terminals 21, 26 and 31 are also adapted to allow the energy system users 50 to communicate with each other and with the Administrator 45 via the network 51 through the use of a network interface, such as an Internet interface, that is connected to the PC computers 22, 27 and 32, and the processor 35. The terminals 21, 26 and 32 can be of the type which may be installed or integrated within the PC computers 22, 27 and 31, respectively. The terminal 46 can also be of the type that may be installed or integrated with the host computer (not shown).

2. The Transmission of Electrical Power

Figure 4:
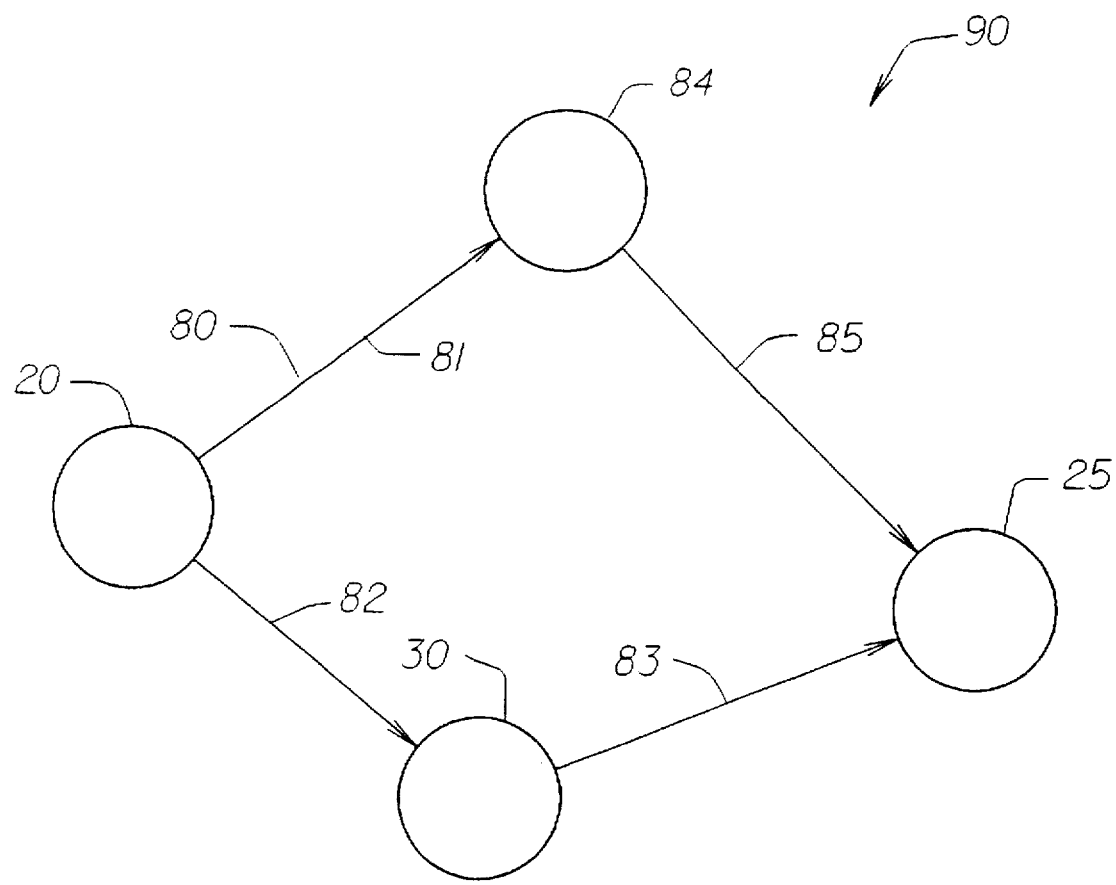
FIG. 4 is a flow chart illustrating the transmission of electrical power from an energy provider to an energy buyer.

As shown in FIG. 4, the provider 20 and buyer 25 are connected to each other through the transmission lines 80, which are used to transfer electrical power from the provider 20 to the buyer 25. The transmission lines 80 are part of the three interconnections or grids that connect electrical utilities throughout the United States and Canada. Within the grids there are some 145 control areas that consist of systems of transmission lines 80 that connect generating units to electrical loads or users of the generated electricity. An example of one such control area is shown in FIG. 4 and is identified by reference numeral 90. In our example, the provider 20 is the generating unit which wants to transmit electrical power to the buyer 25 (the user). Due to transmission electrical network characteristics, the transmission of the electrical power may include several routes that when added together, provide the buyer 25 with the necessary transmission capacity in the energy transportation network to move the requested amount of electrical power.

In this example, the buyer 25 requests a 100 megawatt ("MW") transfer between the provider 20 and the buyer 25. The provider 20 transmits 100 MW to the buyer 25, but the actual transmission occurs over several different transmission routes. The provider 20 transmits 70 MW along first transmission line 81 and 30 MW along second transmission line 82. The transmission line owner 30 of the third transmission line 83 then transfers the incoming 30 MW to the buyer 25. A second transmission line owner 84 which has the fourth set of transmission lines 85 then transfers the incoming 70 MW to the buyer 25. The processor 35 is adapted to identify the energy provider 20, the transmission line owners 30 and 84, the first, second, third and fourth sets of transmission lines 81, 82, 83 and 85, respectively, that assisted in transmitting the electrical power from the provider 20 to the buyer 25 and passes this Energy Information and any loss of energy transmission which the transmission line owners 30 and 84 had to generate to cover for such loss to the Administrator 45.

More specifically, the processor 35 upon receipt of the Energy Information identifies the provider 20, the transmission line owners 30 and 84, the first, second, third, and fourth sets of transmission lines 81, 82, 83 and 85, respectively, that would assist in transmitting the requested electrical power to the buyer 25. The processor 35 sends the Energy Information to the data base 36 for updating the data base 36 in order to have accurate information concerning the total available transmission capacity for any specific set of points along a transmission path. Further, the processor 35 transmits the Energy Information to the terminal 46 for displaying the Energy Information and the identification of the provider 20, the transmission line owners 30 and 84, the first, second, third and fourth sets of transmission lines 81, 82, 83 and 85, respectively, to the Administrator 45.

The Administrator 45 then may send an invoice for the transmitted 100 MW and for any energy generated to cover for any losses to the buyer 25 for payment thereof. The Administrator 45 can request that the buyer 25 send the appropriate portion of the total payment directly to the provider 20, and the transmission line owners 30 and 84, that assisted in the transmission of the 100 MW transfer. Or, alternatively, the Administrator 45 also can receive payment for the 100 MW directly from the buyer 25 and then send the appropriate payment to the provider 20, and to the transmission line owners 30 and 84. Thus, the system 10 is adapted to allow the Administrator 45 to send an invoice that allows the provider 20 and the transmission line owners 30 and 84, to be compensated for the transmission of the electrical power. The system 10 is also adapted to indicate when improvements or increases in the number of transmission lines are needed, because the system 10 identifies when certain facilities are at capacity.

3. Process Description for the Functions Carried Out by the System

Figure 5:
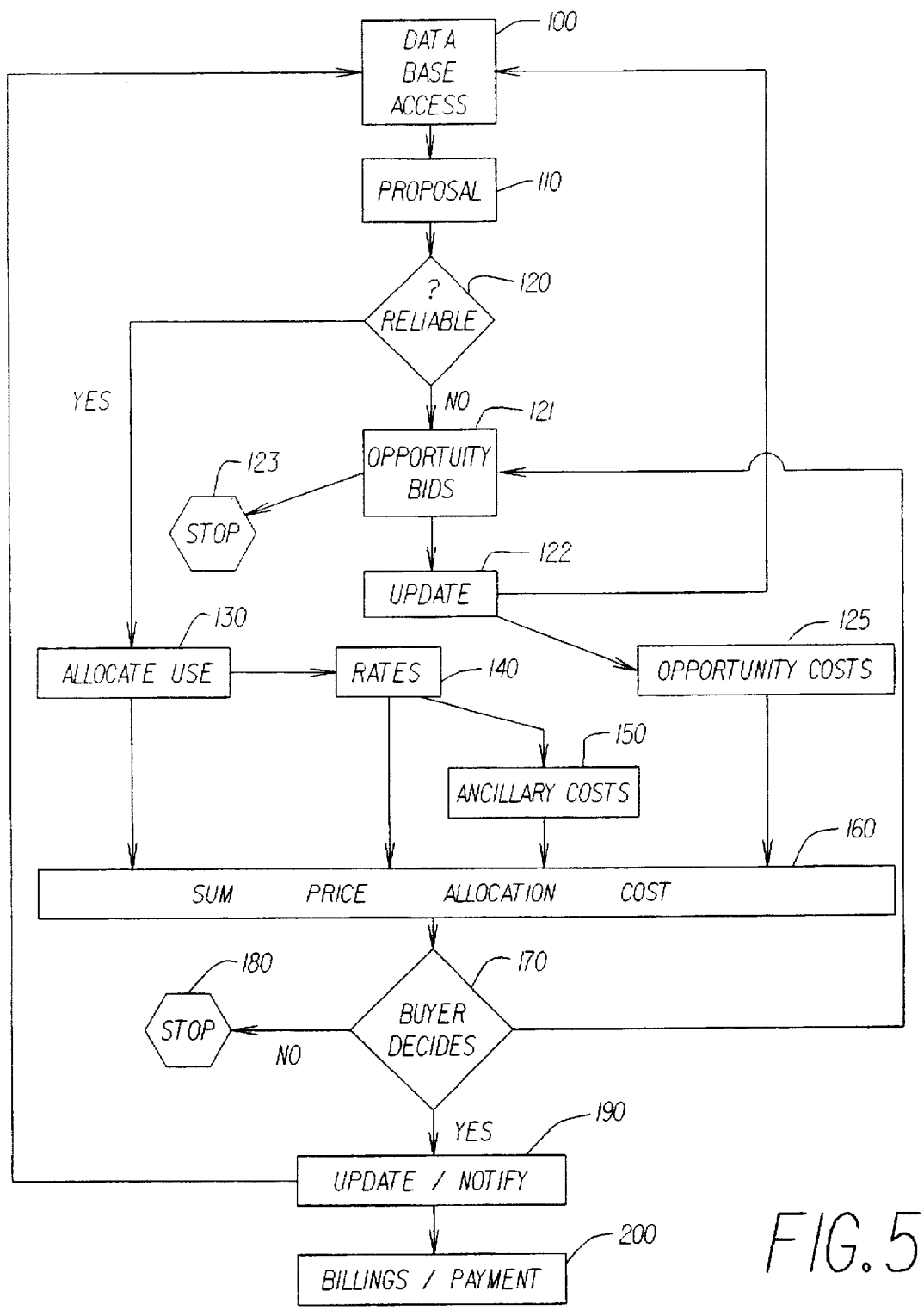
FIG. 5 is a flow chart illustrating the operations carried out by the invention as it applies to a single energy system user.

Referring now to FIG. 5, a flow chart illustrating the functions carried out by the system 10 in coordinating communications and data transmission between the energy system users 50 and the Administrator 45. The flow chart depicts the operation functions carried out primarily by the processor 35 and the PC computers 22, 27 and 32, it being relied that the processor 35 and the PC computers 22, 27 and 32 are conventionally programmed to carry out their respective, traditional functions. As a result, and in accordance with an important feature of the invention, modification of the processor 35 and the PC computers 22, 27 and 32 is generally not required, and thus conventional computer equipment can be utilized.

With reference to FIG. 5, the programmed operations of the processor 35 and the PC computers 22, 27 and 32 start by the detection of a request for data base access from any energy system user 50 by the processor 35 or the PC computers 22, 27 and 32, as shown by flow block 100. The requesting energy system user communicates with its respective PC computer to send to the requesting energy system user via the network 51 current information from the appropriate data file 40, 41 or 42, depending on the type of energy transmission being requested. The current information would include any energy information and transportation information for the proposed transaction. The requested information is transmitted to and received by the requesting energy system user's computer 22, 27 or 32. The program control then branches to flow block 110 where the energy system user 50 proposes a transaction based on the information received from the appropriate data file 40, 41 or 42.

The program control then branches to flow block 120 where the availability of the current electrical system is checked to ensure that when the proposed transaction is added to the energy transportation network any transmission lines 80, 81, 82, 83 and 85 are not loaded above their safe limit. The reliability of a system loaded to its theoretical capacity will be threatened by unplanned, but normal, changes in operations. Also, there must be protection against the loss of a transmission line, which if occurs, the power flows within the affected segment will be redistributed over the surviving system. Therefore, protections in reliability must be considered when proposing a transaction for the transmission of energy.

If there is reliable suppliable electrical power and a user who agrees to have the power transmitted at the reliable service level, then the program control branches to flow block 130 which identifies the facilities of transmission line owners 30 that will be used in the transmission of energy for the proposed transaction. The program control then branches to flow block 140 and allocates the appropriate provider approved rates for the proposed amount of electrical power to be transferred. Additionally, any appropriate ancillary charges are included as noted by flow block 150.

The program then branches to flow block 160 which provides a sum price allocation cost per provider (the "total transmission service price") to the proposed buyer. The program branches to flow block 170 where the proposed buyer evaluates the proposed cost. If the proposed buyer declines the proposed cost, then the program branches to flow block 180, which stops the transaction for the transmission of electrical power.

If the proposed buyer agrees to the proposed cost, then the program branches to flow block 190, which updates the appropriate data file 40, 41 or 42 to indicate the contracted change to the energy transportation network. The updating of the data base 36 thereby provides for a current updated status of the grids. The program control then branches back to flow block 100 where the data base 36 is again available for access by the next user. Simultaneously, the program control branches to flow block 200 where the Administrator 45 requests payment from the user and energy purchaser and transfers such payment to the affected energy supplier and transmission line owners.

If at flow block 120, the determination is made that there is no reliable transmission capacity available for the proposed transfer of electrical power, then the program control transfers to flow block 121, where bids can be requested on behalf of the proposed user from other transmission users. The bids would be based on savings foregone or additional costs ("opportunity cost") necessary to make the needed transmission available. The effect of the proposed bid is first evaluated by the system at flow block 122 by introducing the proposed bid into the existing test data base and a new evaluation is started through flow blocks 100, 110 and 120. If the proposal is effective (at flow block 120) the bid price is entered at flow block 125 where the bid is incorporated with the system allocation (130) rates (140) and ancillary costs (150) and presented to the proposed user as the Sum Price Allocation Cost (160). Additional bids from other users would be evaluated in a similar manner.

If the proposed user decides to proceed, he notifies the Administrator at flow block 190 and 200. The accepted proposed transaction is sent via the network 51 to the processor 35 where the newly accepted transaction is entered in the data base 36. If the proposed buyer does not accept the proposed transaction because of the transmission service price, the program control branches to flow block 180 which stops the evaluation process, or, branches to flow block 121 to seek additional bids. The evaluation continues as discussed above until either a transaction is accepted or all bids are declined.

4. Other Applications

The system 10 is adapted to be able to accommodate other types of energy suppliers and users, such as a natural gas utility. The lines of transmission 80, instead of being electrical transmission lines, would be the natural gas lines that deliver natural gas from the generating or supplying utility to the various users. Further, the system 10 is adapted to accommodate requests for energy directly from the ultimate energy user and not just from another utility. For example, a manufacturing plant could send its request for a supply of energy to the Administrator 45 and the system 10 would operate to provide the manufacturing plant (the energy buyer) with its requested amount of energy. Thus, the system 10 applies to all energy system users 50.

5. Summary

In the operational sense, the system 10 provides a communication and storage means for accumulating energy information in both peak and real time from energy providers 20, buyers 25 and transmission line owners 30. The energy system users 50 are connected via a network 51 with the Administrator 45, who serves as an agent for the energy system users 50, and may serve as a clearinghouse for energy transmission transactions. The communication and storage means includes a processor 35 which receives energy information from an energy system user 50, such as a buyer 25, that may include a request for an amount of suppliable energy. The processor 35 checks the reliability of the available suppliable energy. The processor 35 provides access to the appropriate data file 40, 41 or 42 for receipt and review by the energy system user 50 of the energy information. If there is an energy supplier, such as provider 20, which has available suppliable energy for reliable transmission, and if the buyer 25 agrees on the transmission service price, then the data base 36 is updated with the information concerning the transaction, and provides for a real time status of the electrical transmission system and transmission line loadings.

The system 10 also provides for the Administrator 45, who further improves the efficiency of the system 10 and of the transmission of energy by providing constraint mitigation and other unified services, such as consolidated system accounting functions. The system 10 thus provides for a unified contract for the transmission of energy based on actual flows, proper cost incentives to users and providers of transportation facilities, and provides net accounting functions for the movement of energy.

It is to be understood that while certain forms of the present invention have been illustrated and described herein, it is not to be limited to the specific forms or arrangements or parts described and shown.

What is claimed and desired to be secured by Letters Patent is:

1. A method for providing efficient and orderly communication between at least a first user, an energy producer, and a transmission supplier, and for providing timely transmission of power, said method comprising the steps of:

a. connecting said first user, said producer and said transmission supplier through a network to a computer means having a data base;

b. receiving by said computer means energy information from said producer and said transmission supplier via said network, said energy information including an indication of available power by said producer, and a means of transmission by said transmission supplier;

c. processing and storing said energy information in said data base;

d. receiving by said computer means from said first user via said network a request for said energy information;

e. transmitting to said first user by said computer means via said network said energy information from said data base;

f. transmitting via said network by said first user to said producer and said transmission supplier a first proposal for the transmission of an amount of said available power;

g. verifying reliability of energy transmission along said means of transmission;

h. transmitting to said first user via said network a supply price for said available power by said producer and a first transmission cost by said transmission supplier;

i. transmitting via said network a first acceptance of said supply price and said first transmission cost by said user to said producer and said transmission supplier; and j. updating said data base with information about said first acceptance.

2. The method of claim 1, further including the steps of:

a. finding by said first user an indication of no reliable transmission for said amount of said available power;

b. connecting a second user to said network;

c. receiving by said computer means an indication from said second user of willingness to free up transmission capacity of said means of transmission;

d. processing and storing said indication from said second user with said energy information in said data base;

e. verifying reliability of energy transmission along said means of transmission with said additional transmission capacity;

f. transmitting via said network by said first user a second proposal to said second user, said producer and said transmission supplier for the transmission of said amount of said available power;

g. transmitting via said network to said first user said supply price by said producer, an additional cost for said additional transmission capacity by said second user, and a second transmission cost by said transmission supplier;

h. transmitting by said first user via said network a second acceptance of said first supply price, said second transmission cost and said additional cost to said producer, said second user and said transmission supplier; and i. updating said data base with information about said second acceptance transaction.

3. The method of claim 1, further including the step of:

a. transmitting an invoice by an administrator assisting in the transmission of power to said first user for payment for said transmission of said available power and sending an appropriate portion of said payment to said producer and said transmission supplier.

4. The method of claim 2, further including the step of:

a. sending an appropriate amount of said payment to said second user for said additional transmission capacity.

5. A method for providing efficient and orderly communication between at least a first user, a second user, an energy producer, and a transmission supplier, and for providing timely transmission of power, said method comprising the steps of:

a. connecting said first and second users, said producer and said transmission supplier through a network to a computer means having a data base;

b. receiving energy information from said first and second users, said producer and said transmission supplier via said network, said energy information including an indication of available power by said producer, a means of transmission by said transmission supplier, and an indication from said second user of willingness to free up transmission capacity of said means of transmission;

c. processing and storing said energy information in said data base;

d. receiving by said computer means from said first user via said network a request for said energy information;

e. transmitting by said computer means to said first user via said network said energy information from said data base;

f. transmitting by said first user to said producer and said transmission supplier a first proposal for the transmission of an amount of said available power;

g. verifying reliability of energy transmission along said means of transmission from said producer to said first user;

h. transmitting to said first user via said network a supply price for said available power by said producer and a first transmission cost by said transmission supplier;

i. transmitting via said network a first acceptance of said supply price and said first transmission cost by said first user to said producer and said transmission supplier;

j. communicating said energy information and said first acceptance to an administrator assisting in the transmission of said available power; and k. updating said data base with information about said first acceptance.

6. The method of claim 5, further including the steps of:

a. receiving by said first user via said network an indication of no reliable transmission for said amount of said available power;

b. transmitting via said network by said first user a second proposal to said second user, said producer and said transmission supplier for the transmission of said amount of available power with said additional transmission capacity;

c. verifying reliability of energy transmission along said means of transmission with said additional transmission capacity;

d. transmitting via said network to said first user said supply price by said producer, an additional cost for said additional transmission capacity by said second user and a second transmission cost by said transmission supplier;

e. transmitting via said network a second acceptance by said first user to said producer, said second user and said transmission supplier of said supply price, said second transmission cost and said additional cost; and f. updating said data base with information about said second acceptance.

7. The method of claim 5, further including the step of:

a. transmitting an invoice by said administrator to said first user for payment for said transmission of said available power and sending the appropriate portion of said payment to said producer and said transmission supplier.

8. The method of claim 6, further including the step of:

a. transmitting an invoice by said administrator to said first user for said transmission of said available power and sending the appropriate portion of said payment to said provider, said second user and said transmission supplier.

9. A method for providing efficient and orderly communication between at least a first user, an energy producer, and an energy delivery supplier, and for providing for timely delivery of power, said method comprising the steps of:

a. connecting said first user, said producer and said delivery supplier through a network to a computer means having a data base, said data base having first, second and third data files;

b. receiving by said computer energy information from said producer and said delivery supplier via said network, said energy information including an indication of available power for guaranteed transmissions and for priority and non-priority non-guaranteed transmissions by said producer, a means of delivery for said guaranteed and said non-guaranteed transmissions by said delivery supplier;

c. processing and storing said energy information in said data base, information about said available power for said guaranteed, said priority and said non-priority non-guaranteed transmissions being stored in said first, second and third data files, respectively;

d. receiving by said computer means from said first user a request for said energy information for said guaranteed transmissions;

e. transmitting to said first user by said computer means said energy information from said data base;

f. transmitting by said first user to said producer and said delivery supplier via said network a first proposal for a guaranteed transmission of said amount of said available power;

g. verifying reliability of energy delivery along said means of delivery;

h. transmitting to said first user via said network a supply price and a first delivery cost for said first proposal;

i. transmitting via said network a first acceptance of said supply price and said first delivery cost by said first user to said producer and said delivery supplier;

j. updating said data base with information about said first acceptance;

k. delivering said amount of said available energy to said first user; and l. transmitting by said administrator via said network an invoice to said first user for payment for said delivery and sending the appropriate portion of said payment to said producer and said delivery supplier.

10. The method of claim 9, further including the steps of:

a. receiving by said first user via said network an indication of no reliable transmission for said amount of said available power;

b. connecting a second user to said network;

c. receiving by said computer means an indication from said second user of a willingness to free up transmission capacity of said means of transmission;

d. processing and storing said information from said second user with said energy information in said data base;

e. verifying reliability of energy transmission along said means of transmission with said additional transmission capacity;

f. transmitting by said first user a second proposal to said provider, said second user and said delivery supplier for a guaranteed transmission for said amount of available power with said additional transmission capacity;

g. transmitting to said first user said supply price by said producer, an additional cost for said additional transmission capacity by said second user and a second delivery cost by said delivery supplier;

h. transmitting via said network a second acceptance by said first user of said supply price, said delivery cost and said additional cost to said provider, said second user and said delivery supplier;

i. updating said data base with information about said second acceptance;

j. delivering said amount of said available power to said first user; and k. sending a correct portion of said payment to said second user.

11. The method of claim 9, further including the steps of:

a. receiving by said computer means from said first user a request for said energy information for said priority non-guaranteed transmissions;

b. transmitting by said first user to said producer and said delivery supplier via said network a third proposal for a priority non-guaranteed transmission of said amount of said available power;

c. transmitting to said first user via said network said supply price and a third delivery cost for said third proposal;

d. transmitting via said network a third acceptance of said supply price and said third delivery cost by said first user to said producer and said delivery supplier; and e. updating said data base with information about said third acceptance.

12. The method of claim 9, further including the steps of:

a. receiving by said computer means from said first user a request for said energy information for said non-priority non-guaranteed transmissions;

b. transmitting by said first user to said producer and said delivery supplier via said network a fourth proposal for a non-priority non-guaranteed transmission of said amount of said available power;

c. transmitting to said first user via said network said supply price and a fourth delivery cost for said fourth proposal;

d. transmitting via said network a fourth acceptance of said supply price and said fourth delivery cost by said first user to said producer and said delivery supplier; and e. updating said data base with information about said fourth acceptance.

13. The method of claim 10, wherein said second proposal is for a priority non-guaranteed transmission for said amount of available power.

14. The method of claim 10, wherein said second proposal is for a non-priority non-guaranteed transmission for said amount of available power.

15. A method for providing efficient and orderly communication between at least a first user, an energy producer, an energy delivery supplier and an administrator assisting in the delivery of energy, and for providing timely delivery of energy, said method comprising the steps of:

a. connecting said first user, said producer, said delivery supplier and said administrator through a network to a computer having a data base;

b. receiving by said computer energy information from said producer and said delivery supplier via said network, said energy information including an indication of available energy by said producer and a means of energy delivery by said delivery supplier;

c. verifying the accuracy of said energy information from said delivery supplier;

d. processing and storing said energy information in said data base;

e. receiving by said computer from said first user a request for said energy information;

f. transmitting to said first user by said computer said energy information from said data base;

g. transmitting by said first user via said network to said producer and said delivery supplier a first proposal for the transmission of an amount of said available energy;

h. verifying reliability of energy delivery along said means of delivery from said producer to said first user;

i. transmitting to said first user via said network a supply price by said producer and a first delivery cost by said delivery supplier;

j. transmitting via said network a first acceptance by said first user of said supply price and said first delivery cost to said producer, said delivery supplier and said administrator;

k. updating said data base with information about said first acceptance;

l. delivering said amount of said available energy to said first user; and m. requesting payment from said first user by said administrator for said energy delivery, and sending an appropriate portion of said payment to said energy producer and said delivery supplier.

16. The method of claim 15, further including the steps of:

a. receiving by said first user an indication of no reliable transmission for said amount of said available energy;

b. connecting a second user to said network;

c. receiving by said computer information from said second user of additional transmission capacity if said second user forgoes a prior commitment;

d. processing and storing said information from said second user with said energy information in said data base;

e. verifying reliability of energy transmission along said means of transmission with said additional transmission capacity;

f. transmitting by said first user via said network a second proposal to said producer, said second user and said delivery supplier for the delivery of said amount of available energy;

g. transmitting to said first user said supply price by said producer, an additional cost for said additional transmission capacity by said second user and a second delivery cost by said delivery supplier;

h. transmitting by said first user via said network a second acceptance by said first user of said supply price, said delivery cost and said additional cost to said second user, said producer and said delivery supplier;

i. updating said data base with information about said second acceptance; and j. delivering said amount of available energy to said first user.

17. A method for providing efficient and orderly communication between a buyer of energy, an energy producer, a transmission supplier and an administrator to assist in the transmission of energy, and for providing timely transmission of energy, said method comprising the steps of:

a. connecting said buyer, said producer, said transmission supplier and said administrator through a network to a computer means having a data base;

b. receiving by said computer means energy information from said producer and said transmission supplier via said network, said energy information including an indication of available energy by said producer, a means of transmission and the physical characteristics and locations of said means of transmission by said transmission supplier;

c. verifying the accuracy of said energy information from said transmission supplier;

d. processing and storing said energy information in said data base;

e. causing a communication path to be established between said administrator, said buyer, said producer and said transmission supplier via said network;

f. communicating said energy information to said administrator, said buyer, said producer and said transmission supplier;

g. transmitting by said buyer a proposal for the transmission of an amount of available energy to said producer and said transmission supplier;

h. transmitting to said buyer a supply price and a transmission cost for said proposal by said producer and said transmission supplier;

i. verifying reliability of energy transmission along said means of transmission;

j. transmitting by said buyer a first acceptance of said supply price and said transmission cost for transmission of said amount of said available energy to said producer, said transmission supplier and said administrator;

k. updating said data base with information about said first acceptance; and l. transmitting said amount of said available energy to said buyer.

18. A method for providing efficient and orderly communication between at least a first utility, a second utility, and an energy delivery supplier, and for providing timely delivery of energy, said method comprising the steps of:

a. connecting said first and said second utilities, respectively, and said delivery supplier through a network to a program-controlled processor having a data base;

b. receiving by said processor energy information from said first and second utilities, and said delivery supplier, said energy information including an indication of available energy by said first utility, and a means of delivery by said delivery supplier;

c. verifying the accuracy of said energy information from said delivery supplier;

d. processing said energy information by said processor and communicating said energy information to an administrator assisting in the delivery of said suppliable energy to said second utility;

e. storing said energy information in said data base;

f. receiving by said processor from said second utility a request for access to said energy information;

g. transmitting to said second utility said energy information from said data base;

h. transmitting a proposal by said second utility to said first utility and said delivery supplier for delivery of an amount of said available energy;

i. verifying reliability by said processor of energy delivery along said means of delivery from said first utility to said second utility;

j. transmitting to said second utility a supply price by said first utility and a delivery cost by said delivery supplier;

k. transmitting a first acceptance of said supply price and said delivery cost by said second utility to said first utility, said delivery supplier and said administrator;

l. updating said data base with information about said first acceptance; and m. delivering said amount of said available energy to said second utility.

19. The method of claim 18, further including the steps of:

a. receiving by said second utility an indication of no reliable transmission means for said amount of said available energy;

b. connecting an energy user to said network;

c. receiving by said processor information by said energy user of additional transmission capacity of said means of transmission if said energy user forgoes a prior commitment;

d. processing and storing said information from said energy user with said energy information in said data base;

e. verifying reliability of energy transmission along said means of transmission with said additional transmission capacity;

f. transmitting by said second utility a proposal to said first utility, said energy user and said delivery supplier for the delivery of said amount of available energy;

g. transmitting to said second utility said supply price by said first utility; an additional cost for said additional transmission capacity by said energy user and a second delivery cost by said delivery supplier;

h. transmitting by said second utility a second acceptance of said supply price, said second delivery cost and said additional cost to said energy user, said administrator and said delivery supplier via said network;

i. storing information about said second acceptance in said data base; and j. delivering said amount of available energy to said second utility.

\* \* \* \* \*